United States Patent [19]

Kanda

[11] Patent Number: 4,712,206
[45] Date of Patent: Dec. 8, 1987

[54] TRACKING ERROR SIGNAL DETECTING DEVICE WITH A TWO-BEAM SYSTEM FOR USE IN AN OPTICAL INFORMATION MEMORY

[75] Inventor: Shigeto Kanda, Tokyo, Japan

[73] Assignee: Canon Kabushiki Kaisha, Tokyo, Japan

[21] Appl. No.: 20,175

[22] Filed: Feb. 27, 1987

Related U.S. Application Data

[63] Continuation of Ser. No. 574,061, Jan. 26, 1984, abandoned.

[30] Foreign Application Priority Data

Jan. 31, 1983 [JP] Japan .................................. 58-12652

[51] Int. Cl.$^4$ .......................... G11B 7/09; G11B 7/095
[52] U.S. Cl. ........................................ 369/46; 369/44; 369/124
[58] Field of Search ................ 369/44, 45, 46, 54, 369/58, 100, 106, 107, 109, 111, 124, 174, 175; 250/201 DF, 202

[56] References Cited

U.S. PATENT DOCUMENTS

| | | | |
|---|---|---|---|
| 4,118,736 | 10/1978 | Okada et al. | 250/201 DF X |
| 4,167,024 | 9/1979 | Hamisch | 369/46 |
| 4,243,848 | 1/1981 | Utsumi | 369/124 X |
| 4,243,850 | 1/1981 | Edwards | 369/109 X |
| 4,290,122 | 9/1981 | Bates et al. | 369/45 X |
| 4,338,682 | 7/1982 | Hosaka et al. | 369/46 X |
| 4,340,950 | 7/1982 | Kosaka | 369/124 X |
| 4,426,690 | 1/1984 | Motoyama | 369/45 |
| 4,476,555 | 10/1984 | Joichi et al. | 369/46 X |
| 4,506,149 | 3/1985 | Utsumi | 369/44 X |
| 4,539,665 | 9/1985 | Iso et al. | 369/46 X |

Primary Examiner—Raymond F. Cardillo
Assistant Examiner—Wayne R. Young
Attorney, Agent, or Firm—Fitzpatrick, Cella, Harper & Scinto

[57] ABSTRACT

A tracking error signal is detected by irradiating an information pattern recorded on an information carrying member with first and second light beams, the second light beam being incident on the information carrying member at a position which is spaced from the incidence position of the first light beam at least in the direction orthogonal to the tracing direction of the information pattern, the light beams modulated by the information pattern being independently photoelectrically converted, an envelope-detection being effected with respect to the outputs obtained by the conversion, and on the basis of the output signals formed by the envelope-detection, the tracking error signal being produced.

5 Claims, 14 Drawing Figures

TRACKING ERROR SIGNAL DETECTING DEVICE WITH A TWO-BEAM SYSTEM FOR USE IN AN OPTICAL INFORMATION MEMORY

This application is a continuation of application Ser. No. 574,061, filed Jan. 26, 1984, now abandoned.

BACKGROUND OF THE INVENTION

1. Field of the Invention

This invention relates to a tracking error signal detecting device which is applicable to an optical head for reproducing, with light, information recorded on an information carrying member.

2. Description of the Prior Art

The optical head as mentioned above generally includes a light source such as a laser or the like, an optical system comprising a collimator lens, objective lens or the like, and a light receiving element such as a PIN photodiodes or the like. The light beam emerging from the light source is converged on an information carrying member such as a disc and is optically modulated by the information recorded on the information carrying member, thereafter the modulated light is photoelectrically converted by the light receiving element whereby the recorded information is converted into electrical signals. Such optical head is applicable to an optical video disc, optical digital audio disc, optical information file and the like. The recorded information usually comprises fine or minute patterns formed concentrically or spirally on a rotatable disc-like information carrying member disc). These patterns are defined by surface unevenness, partially formed holes, variation in the reflection factor, difference in the direction of magnetization or the like.

In any application of the optical head, the patterns must be minute in order to improve the recording density. Therefore, the reproduction of such recorded information on the information carrying member requires that the converging beam precisely traces the track comprising minute pattern array. In a case of the aforesaid disc, for example, the track will displace in the radial direction of the disc with the rotation thereof due to any eccentricity or the like. This requires the provision of means for moving the converging beam or the disc to trace the track even if it is concentric, and, in turn requires detection of a tracking error signal which represents deviation of the converging beam from the track.

There are known several tracking error signal detecting device such as follows:

(1) Tracking Error Signal Detecting Device of Three-Beam System

FIG. 1 of the accompanying drawings shows an example of this device in which the light beam emerging from a light source 1 such as a semiconductor laser is collimated by a collimator lens 2 and the collimated beam is split by a diffration grating 3 into three light beams. These split light beams after transmission through a half-mirror 4 are converged by an objective lens 5 on an information carrying member 6 such as a disc. At this time, as shown in FIG. 2, one of the converged beams is incident on the substantially central position of a minute pattern 7 on the information carrying member 6 to form a primary beam spot 8, while the remaining two beams are distributed over the pattern 7 in the directional components orthogonal to the tracing direction of the minute pattern 7 to form secondary beam spots 9 and 10, respectively.

The reflected light of the beam spot 8 incident on the substantially central position of the pattern 7 is optically modulated by the minute pattern 7 and, by way of the objective lens 5, half-mirror 4 and a condensing lens 11, it is photoelectrically converted by a photoelectric converter 12 such as a PIN photodiode whereby an information signal $V_A$ is generated from a current-to-voltage converter 13, such as shown in FIG. 3. On the other hand, the reflected light beams of the aforesaid remaining two converging light beams are optically modulated by the minute pattern 7 and these modulated light beams are photoelectrically converted by photoelectric converters 14 and 15, respectively. These converted signals are supplied to current-to-voltage converters 16 and 17, respectively, and then supplied to low-pass filters 18 and 19, respectively, for elimination of the frequency components of the aforesaid information signal $V_A$. Subsequently, the output signals of the low-pass filters 18 and 19 are applied to a differential amplifier 20 to detect the difference between these signals to thereby detect a tracking error signal $V_B$. Denoted by a chain-line 21 in FIG. 1 is an optical head, while denoted by an arrow X in FIG. 2 is the direction of movement of the minute pattern 7.

(2) Tracking Error Signal Detecting Device of Feterodyne System

FIG. 4 shows an example which is disclosed in Japanese Patent Application Laid-Open No. 3236/1982, in which a single beam is converged on an information carrying member and the light beam optically modulated by the fine pattern is directed to a four-division photoelectric converter 22. The converter 22 comprises four elements 22A, 22B, 22C and 22D constituting two pairs of diagonally opposing elements. The outputs of the elements in each pair are added to each other by an adder 23A or 23B. Then, at a subtractor 24A and an adder 24B, the subtracting and adding operations are effected relative to the outputs of the adders 23A and 23B to obtain an information reproducing signal RF and a differential signal DL. Next, by using a pulse generator 25, a pulse is generated at the zero-cross time of the information reproducing signal RF, and by using it as a sampling pulse, a sample-hold circuit 26 sample-holds the differential signal DL. The held signal after being filtered by a low-pass filter 27 is detected as a tracking error signal $V_C$.

(3) Tracking Error Signal Detecting Device of Push-Pull System

In this device, a single light beam is converged on an information carrying member and the light beam optically modulated by the minute pattern is directed to a two-division photoelectric converter. The difference between the output of two elements of the photoelectic converter is detected as the tracking error signal while the sum of the outputs is detected as the information signal.

These conventional devices have several problems such as follows:

In the detecting device described in Item (1), the light beam emerging from the light source is divided into three beams. Therefore, the quantity of each of the divided light beams can not be increased which is a bar to realization of higher S/N ratio in generating the detection signal.

In the detecting device described in Item (2), a complicated structure is required to effect the sample-hold operation relative to the light beam particularly when the frequency of the information signal is high.

In the detecting device described in Item (3), the photoelectric converter is usually located at the position which is not optically conjugate with the beam spot on the information carrying member. Therefore, when the information carrying member is moved in the directions orthogonal to the surface thereof, the optical path is changed so that the shape of the pattern projected onto the photoelectric converter is changed. Whereby it is difficult to detect any tracking error precisely. If, in order to overcome such problem, the photoelectric converter is disposed in the optically conjugate relation with the beam spot on the information carrying member, a greater length of the optical path is required because two photoelectric converter elements of ordinary size are necessary for separately detecting the optical modulation of the tracking error.

SUMMARY OF THE INVENTION

An object of the present invention is to provide a tracking error signal detecting device having simple and compact optical and electrical systems and having a higher reliability in the detection of the information signal and tracking error signal from an information carrying member.

The above object is achieved by the present invention, in a tracking error signal detecting device according to which, there are provided means for irradiating an information pattern recorded on an information carrying member with a first light beam and a second light beam, the second light beam being incident on the information pattern at a position which is spaced from the incidence position of the first light beam at least in the direction orthogonal to the direction of tracing of the information pattern, means for independently photoelectrically converting the first and second light beams after they are modulated by the information pattern, means for effecting envelope-detection relative to each of the outputs from the photoelectrically converting means to produce first and second detection signals, and means for detecting a tracking error signal on the basis of the first and second detection signals.

Other objects and features of the present invention will be apparent from the following description taken in conjunction with the accompanying drawings.

DESCRIPTION OF THE PREFERRED EMBODIMENTS

Figure 1:
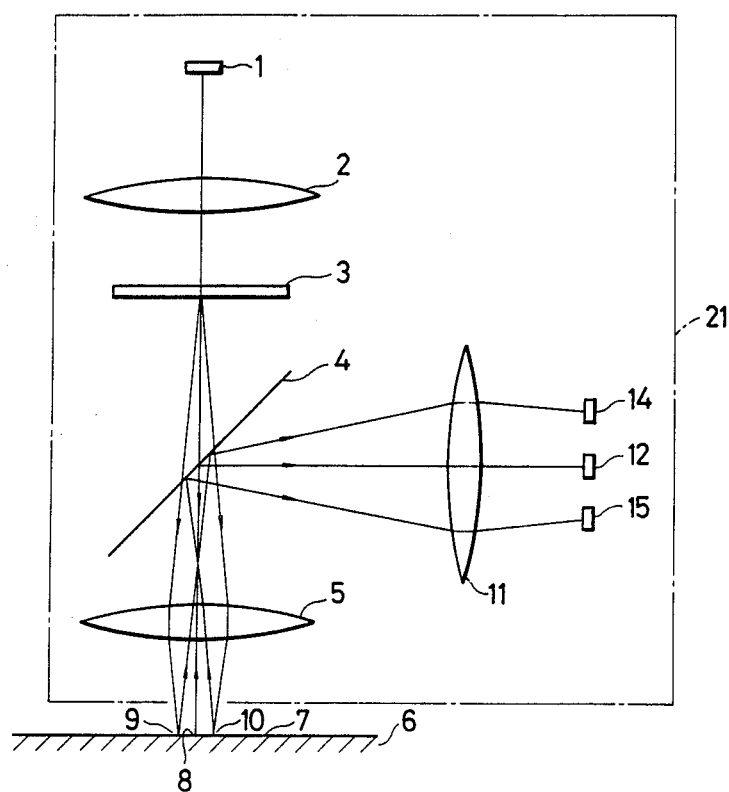
FIG. 1 is a schematic view showing an example of the optical head in the conventional tracking error signal detecting device of three-beam system.
Figure 2:
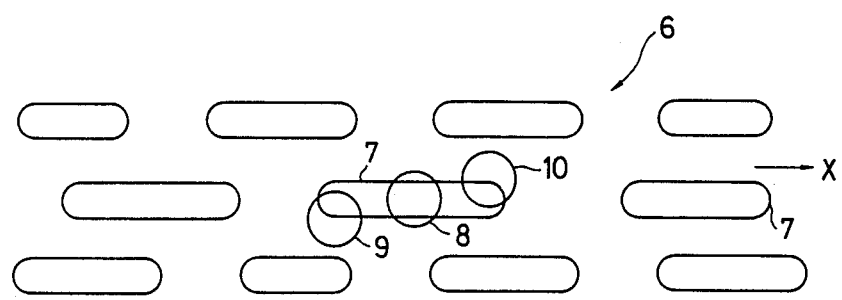
FIG. 2 is a plan view showing the positional relation between the light beam spots and the minute pattern in the device shown in FIG. 1.
Figure 3:
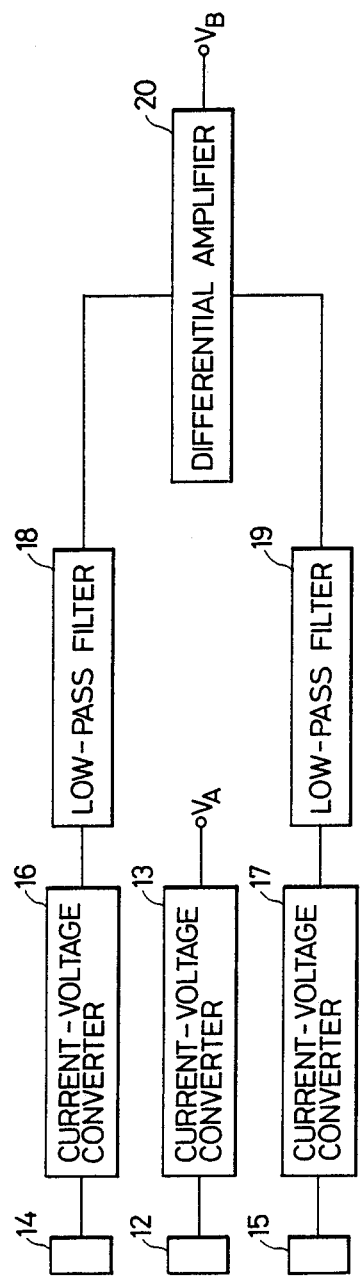
FIG. 3 is a block diagram showing the configuration of the signal processing unit of the device shown in FIG. 1.
Figure 4:
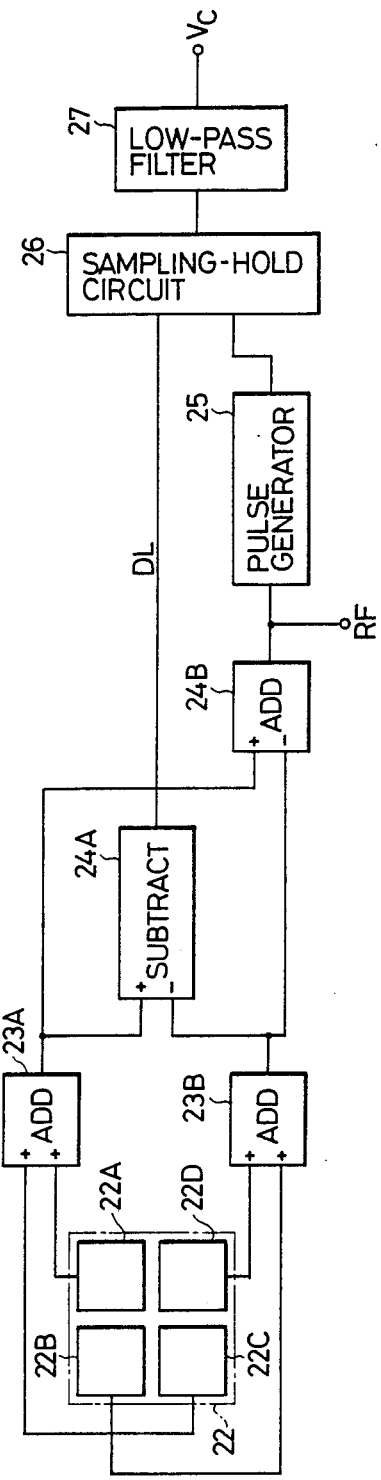
FIG. 4 is a block diagram showing the configuration of the signal processing unit in the conventional tracking error signal detecting device of heterodyne system.
Figure 5:
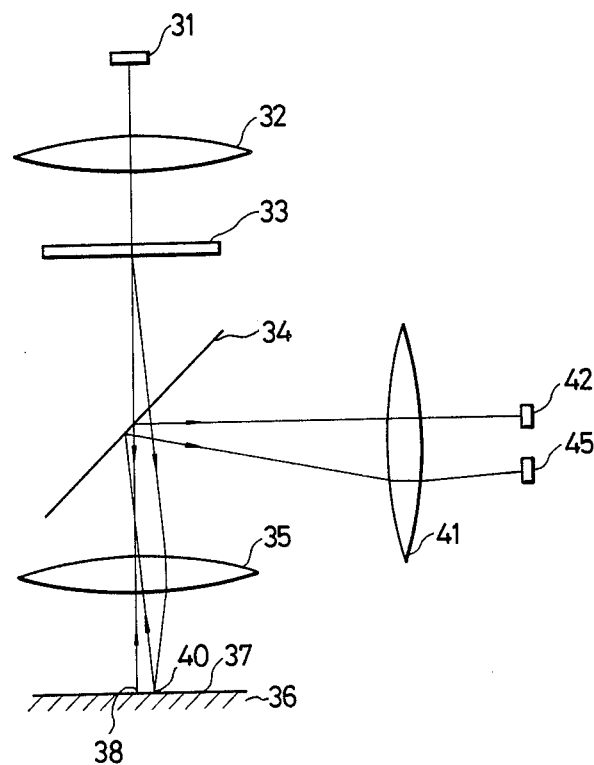
FIG. 5 is a schematic view showing an embodiment of the optical system of the device according to the present invention.
Figure 6:
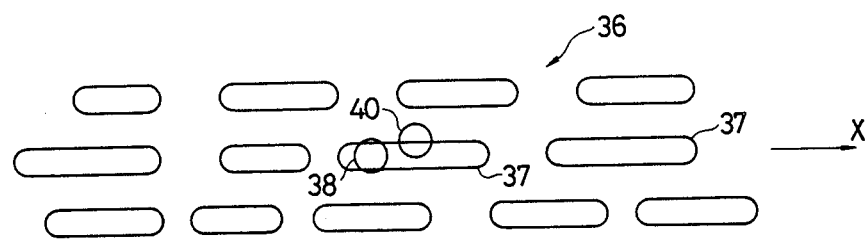
FIG. 6 is a plan view showing an example of the positional relation between the light beam spots and the minute pattern in the device shown in FIG. 5.

Referring to FIG. 5 showing the optical system of the device according to one embodiment of the present invention, the light beam emerging from a light source 31 such as a semiconductor laser is collimated by a collimator lens 32 and is divided into two light beams by a diffraction grating 33. At this time, by using such diffraction grating as having directivity (e.g., one which produces only the positive first-order diffraction light), two light beams of satisfactory intensity are obtainable. Alternatively, the diffraction grating may be replaced by a wedge-prism. These two light beams, after transmission through a half-mirror 34, are converged by an objective lens 35 onto an information carrying member 36 such as a disc. On this information carrying member 36, as is shown in FIG. 6, a primary beam spot 38 is formed to trace substantially the center of each of minute patterns 37 and also a secondary single beam spot 40 is formed to trace the track of the minute patterns 37 while partially overlapping the track.

The reflected light beams of the primary and secondary beam spots 38 and 40 are optically modulated by the minute pattern 37 and, by way of the objective lens 35, half-mirror 34 and a condensing lens 41, are photoelectrically converted by photoelectric converters 42 and 45 such as PIN photodiodes, respectively.

Figure 7:
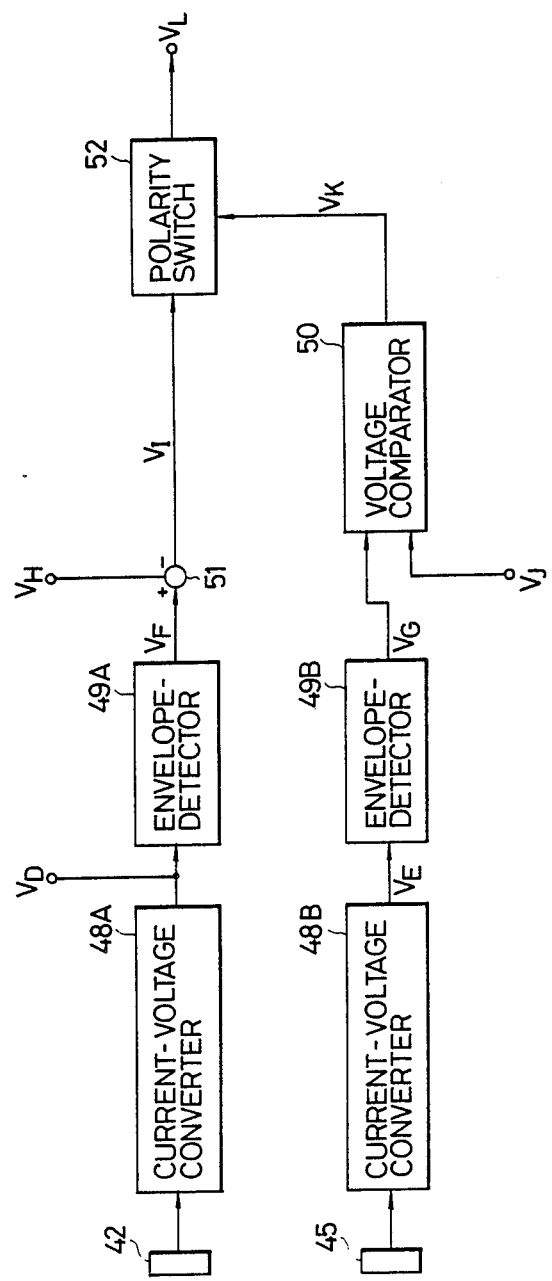
FIG. 7 is a block diagram showing an example of the configuration of the signal processing unit of the device shown in FIG. 5.

FIG. 7 shows an example of the arrangement of the signal processing unit of the device according to the present invention, wherein denoted by 48A and 48B are current-to-voltage converters for converting respectively, into voltages, the currents from the corresponding photoelectric converters 42 and 45; denoted by 49A and 49B are envelope-detectors connected respectively to the output terminals of the corresponding converters 48A and 48B; denoted by 50 is a voltage comparator for comparing the output $V_G$ of the envelope-detector 49B with a reference voltage $V_J$; denoted by 51 is an add-subtractor for effecting adding and subtracting operations with respect to the output $V_F$ of the envelop-detector 49A and a reference voltage $V_H$; and denoted by 52 is a polarity switch for changing-over the polarity of the output $V_I$ of the add-subtractor 51 with the voltage $V_K$ of the voltage comparator 50.

Figure 8:
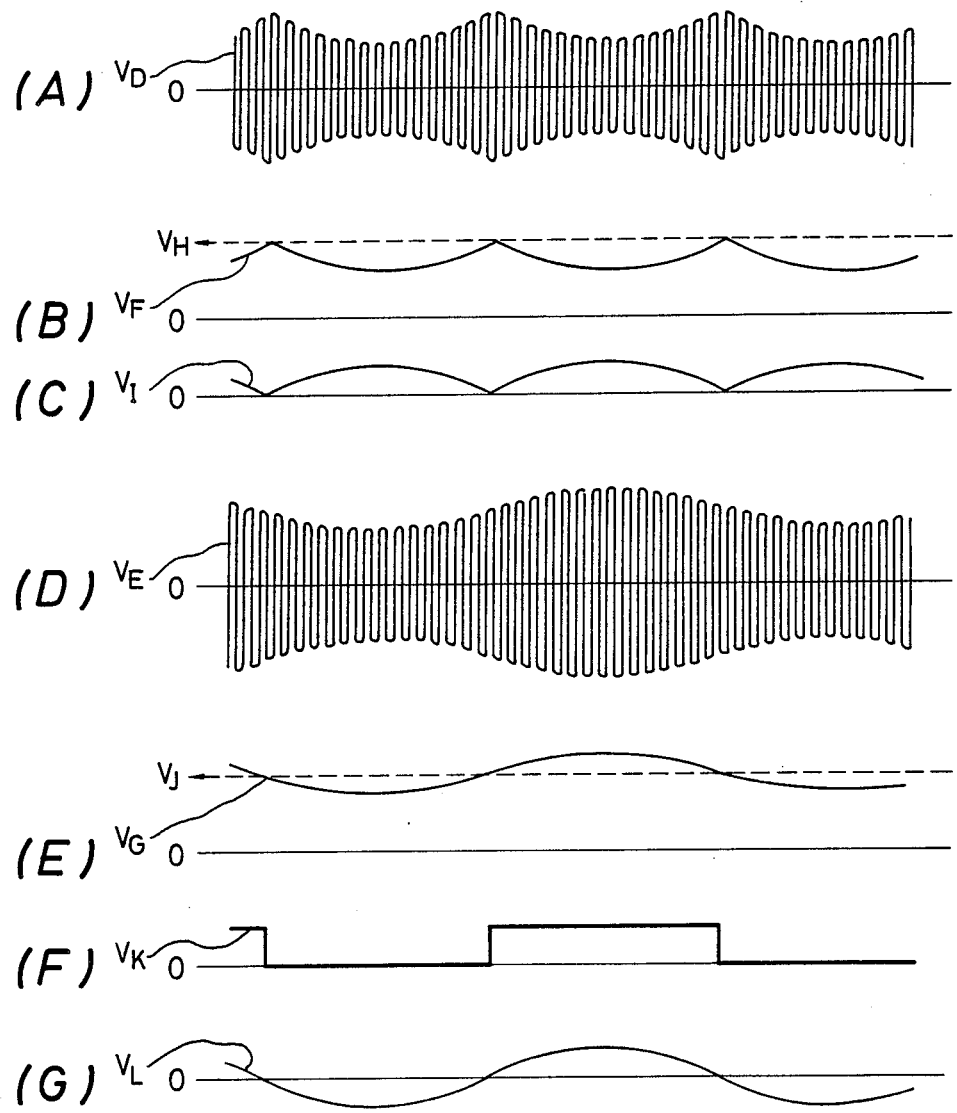
FIGS. 8(A)–(G) shows examples of the signal waveforms of respective portions of the unit shown in FIG. 7.

Referring to the waveforms shown in FIG. 8, the operation of the device of the present invention shown in FIGS. 5–7 will now be described.

The output currents obtained by the photoelectric converters 42 and 45 are subjected to the current-to-voltage conversion at the current-to-voltage converters 48A and 48B, respectively, whereby reproduction output signals $V_D$ and $V_E$ shown in FIG. 8A and FIG. 8D are derived. In this case, the reproduction output signal $V_D$ is the information signal. These reproduction output signals $V_D$ and $V_E$ are subjected to the envelope-detection at the envelope-detectors 49A and 49B, respectively, to form envelope-detection signals $V_F$ and $V_G$ shown in FIG. 8B and FIG. 8E.

By the add-subtractor 51, the envelope-detection signal $V_F$ is subtracted from a pre-set reference value signal $V_H$ to obtain an error signal $V_I$ which in turn is applied to the polarity switch 52 (FIG. 8B and FIG. 8C). This signal $V_I$ represents the amplitude of the tracking error. On the other hand, the voltage comparator 50 compares the envelope-detection signal $V_G$ with a pre-set reference value signal $V_J$ to produce a polarity signal $V_K$ (FIG. 8E and FIG. 8F). This polarity signal $V_K$ represents the polarity of the tracking error. The polarity switch 51 changes-over the polarity of the error signal $V_I$ with the polarity signal $V_K$ to form a tracking error signal $V_L$ (FIG. 8G).

According to the present invention, as has been described in the foregoing, the information carrying member is irradiated with a primary beam and a secondary single beam, these beams providing beam spots to be modulated by the minute pattern. Then the optical modulation of each of the beam spots is detected by an associated one of the separate photoelectric converters, the outputs therefrom being subjected to the envelope-detection and the predetermined operations. Thus, the information signal and the tracking error signal can be detected with a simple and compact structure.

Further, the present invention is effective to increase the quantity of each of the light beams as compared with the conventional tracking error signal detecting device of a three-beam system. Moreover, the present invention ensures simplification of the signal processing unit as compared with the conventional tracking error signal detecting device of heterodyne system. Still further, the device of the present invention is less sensitive to the affects of any movement of the information carrying member in the directions orthogonal to the surface thereof as compared with the conventional tracking error signal detecting device of push-pull system.

The present invention is not limited to the form of the above-described embodiment, but various modifications are possible. For example, the combination of a single light source with a diffraction grating for providing plural beam spots may be replaced simply by a plurality of light sources. Further, the modulated light beams from the minute pattern on the information carrying member are not limited to the reflective light but may be transmissive light.

Furthermore, the information carrying member (recording member) may be of any form, such as disc, tape, drum, card and etc.

What I claim is:

1. A tracking error signal detecting device for use in an optical information memory comprising:
   means for applying a first light beam spot on a substantially central position of a track formed on an information carrying member and applying a second light beam spot on a position of said track which is spaced from the incidence position of the first light beam spot at least in a direction orthogonal to a direction of tracing of the track;
   means for independently photoelectrically converting light beams obtained from said first and second light beam spots respectively and modulated by said track;
   means for effecting envelope-detection with respect to outputs of said photoelectrically converting means to produce first and second detection signals;
   means for obtaining a difference between said first detection signal and a pre-set first reference value signal to produce an error signal;
   means for comparing said second detection signal with a pre-set second reference value signal to produce a polarity signal; and
   means for changing over the polarity of the error signal in accordance with the polarity signal to derive a tracking error signal.

2. A device according to claim 1, wherein an information signal is reproduced from the light beam obtained from said first light beam spot and modulated by said track.

3. A device according to claim 1, wherein said applying means includes a light source and means for dividing a light beam emerging from said light source into two light beams for respectively forming said first and second light beam spots.

4. A device according to claim 1, wherein said photoelectrically converting means includes two photodetectors corresponding to the light beams obtained from said first and second light beam spots, respectively.

5. A device according to claim 4, wherein said means for producing detection signals includes two sets of current to voltage converters and envelope-detectors connected to said photodetectors.

* * * * *